(12) United States Patent
Gemelli et al.

(10) Patent No.: US 7,289,502 B1
(45) Date of Patent: Oct. 30, 2007

(54) METHOD AND DEVICE FOR ROUTING OR COMPRESSING PACKETS DESTINATION ADDRESS CONTAINING CLASSLESS ADDRESS

(75) Inventors: Riccardo Gemelli, S. Colombano/L (IT); Marco Pavesi, Vigevano (IT); Salvatore Matteo Crudo, Milan (IT)

(73) Assignee: Italtel S.p.A., Milan (IT)

( * ) Notice: Subject to any disclaimer, the term of this patent is extended or adjusted under 35 U.S.C. 154(b) by 1201 days.

(21) Appl. No.: 10/148,796

(22) PCT Filed: Oct. 4, 2000

(86) PCT No.: PCT/IT00/00398

§ 371 (c)(1),
(2), (4) Date: Jun. 4, 2002

(87) PCT Pub. No.: WO02/29632

PCT Pub. Date: Apr. 11, 2002

(51) Int. Cl.
*H04L 12/56* (2006.01)
*H24J 3/24* (2006.01)
(52) U.S. Cl. ...................... 370/392; 392/475
(58) Field of Classification Search ............... 370/393, 370/475, 395.31–395.32, 401, 427, 521, 370/477
See application file for complete search history.

(56) References Cited

U.S. PATENT DOCUMENTS 5,946,679 A * 8/1999 Ahuja et al. .................. 707/3
6,052,683 A * 4/2000 Irwin ............................ 707/8
6,061,712 A * 5/2000 Tzeng ........................ 709/202
6,526,055 B1 * 2/2003 Perlman et al. ............. 370/392
6,563,823 B1 * 5/2003 Przygienda et al. ........ 370/392
6,631,419 B1 * 10/2003 Greene ........................ 709/238
7,027,445 B1 * 4/2006 Sunada et al. ........... 370/395.31
7,039,641 B2 * 5/2006 Woo ........................... 707/100
2002/0143787 A1 * 10/2002 Knee et al. .................. 707/102
2004/0024757 A1 * 2/2004 Park et al. ..................... 707/3
2005/0157724 A1 * 7/2005 Montuno et al. ........... 370/392

* cited by examiner

*Primary Examiner*—Kwang Bin Yao
*Assistant Examiner*—Warner Wong
(74) *Attorney, Agent, or Firm*—Wolf, Block, Schorr & Solis-Cohen LLP

(57) ABSTRACT

The invention relates to a method of routing or compressing packets destination address through an electronic routing or compressing device, the packets destination address being n bit packets and having address indicative of a desired destination, the address being classless, the routing device having at least a data base of prefix entries, each of which containing entries corresponding to a desired output data link, the method having the steps of: a) generating an address mask until an entry matching a masked address obtained by making an AND operation between the packets destination address and the address mask, is found in the data; the address mask having a number of bit equal to that of the packets destination address and having, starting from the most significant n-bit equal to 1 and the remaining i bit equal to 0, with $0<=u<=b.1$, with the first generated mask having i=0 or i=1, b) if a match is found, stopping the generation of masked address and outputting the output data link corresponding to the match, c) if no match is found, outputting a message indicating that no output data link was found.

24 Claims, 3 Drawing Sheets

# METHOD AND DEVICE FOR ROUTING OR COMPRESSING PACKETS DESTINATION ADDRESS CONTAINING CLASSLESS ADDRESS

FIELD OF THE INVENTION

The present invention relates to a method and device for routing or compressing packets destination address through an electronic routing or compressing device, said packets destination address being n bit packets comprising and address indicative of a desired destination, said address being a subnet or supernet address, i.e. a classless address, said routing device comprising at least a database of prefix entries, each of which containing entries corresponding to a desired output data link.

The present invention relates to a method and device for routing or compressing packets destination address through an electronic routing or compressing device, said packets destination address being n bit packets comprising an address indicative of a desired destination, said address being a subnet or supernet address, i.e. a classless address, said routing device comprising at least a database of prefix entries, each of which containing entries corresponding to a desired output data link.

BACKGROUND OF THE INVENTION

In the present contest by the term packet destination address it is meant the destination IP address or other known related protocol fields that may be used for routing. In the case of an IP address the packet destination address comprises, starting from bit 0, i.e. the more left bit, referred in this description also as most significant bit (MSB):

- a first portion comprising a fixed number of bit which identifies the class of the supernet or subnet address,
- a second portion comprising the supernet or subnet address.

The above mentioned fixed number of bit is 1, 2, 3, 4, 5 bit for, respectively, classes A, B, C, D, E. Therefore, to each IP address it may be associated a fixed value indicating the smallest bit index of the portion of the packets destination address containing the IP address.

In the present contest by the term "routing" it is meant the operation by which, starting from a packets destination address, i.e. an IP address, a search in a data base, i.e. a routing table, is made for an entry that matches an address portion contained in said packets destination address. In particular the search may be a search for the longest entry that matches an address portion contained in said packets destination address, this kind of routing will be referred in the present contest as best prefix matching routing.

The routing table search process is the most important operation in the IP routing method. When an IP address, identified in the current IP version 4 implementations by a unique 32-bit field, is received by a router, the network prefix contained in this address must be considered in order to search in a forwarding table using the network prefix as its key and in order to determine which entry in the table represents the best route for the address to take in its journey across its destination. For optimising the searching procedure, known procedures provide compressing the network prefix in order to perform the search in a table having a limited size. Many compression methods are known. In particular, we will refer to a method based on predictable duration algorithms, and among this class of algorithms to the algorithms suitable of a pipelined implementation. In particular, we will refer to the pipelined algorithm based on the CSSA method (clustered sequential search algorithm) described in EP0.978.966 A1.

In the present contest by the term pipelined method it is meant a routing or compression method which allows a plurality of address which has to be routed or compressed to be present at the same time in the hardware implementation of said method, i.e. a method which allows to issue a routing or compression request if a previously issued one has not been served yet.

On the other hand, in order to overcome the known problem of running out of address space (ROADS problem) there have been introduced subnet and supernet IP addresses, which will be referred to further in the application as classless address.

Not all the routing and compression methods can handle classless address. In particular, the above-mentioned CSSA method cannot handle these addresses.

OBJECTS AND SUMMARY OF THE INVENTION

An object of the invention is that of developing a routing and a compression method which can operate with classless address.

This and further objects which will be apparent to an expert in the art are attained by a routing and a compression method according to the characterising part of the independent claims.

BRIEF DESCRIPTION OF THE DRAWINGS

The invention is described by way of a non-limiting example in the following drawings, which show.

DETAILED DESCRIPTION OF THE INVENTION

The method according to the present invention relates to a method of routing or compressing packets destination address through an electronic routing or compressing device, said packets destination address being n bit packets comprising address indicative of a desired destination, said address being classless address, said routing or compressing device having at least a database of prefix entries, each of which containing entries corresponding to a desired output data link.

The method comprises the steps of:

a) generating an address mask until an entry matching a masked address obtained by making a masking operation between said packet destination address and said address mask, is found in said data base;

b) said masking operation being:
   an AND operation if the masking value is 0 and the not masking value 1; or
   an OR operation if: the masking value is 1 and the not masking value 0, and the packet destination address and the address mask are negated before being inputted to the OR operation and the output of said OR operation is negated, c) said address mask having a number of bit equal to that of the packets destination address and comprising two portions:
   a first portion starting from bit 0, i.e. the bit which is the most left in the IP address, referred in this text also as most significant bit (MSB), and ending with a bit (n−1)−i, and
   a second portion starting from bit n−i and ending with bit n−1, d) the first portion comprising only the not masking value and the second portion only the masking value, i being an integer comprised between 0 and n−1, the first generated address mask having i=0 and no second part, i being incremented by one until a match is found or it has reached a fixed value, d) if a match is found, stopping said generation of address masks and outputting the output data link corresponding to said match, e) if no match is found or i is equal to said fixed value, outputting a message indicating that no output data link was found.

Said fixed value is preferably the smallest bit index of the IP network portion of the packet destination address. Therefore, for class A, B, C, D, E subnet or supernet packets destination address the fixed value are, respectively: 1, 2, 3, 4, 5. In general in packet routing, packet fields different from the packet destination address may be used in combination with the packet destination address itself to form a vector on which the routing algorithm bases the routing choice. If the method according to the invention is used for routing or compressing in cases like the ones described above the above-defined vector is used in place of the destination IP address. In such a case the introduced fixed value may be 0 or may be comprised between 0 and n if some of the bits of the above-defined vector are not used.

The matching between the data base entry and the masked address (1,1A) may be an exact prefix matching or a best prefix matching.

Figure 1:
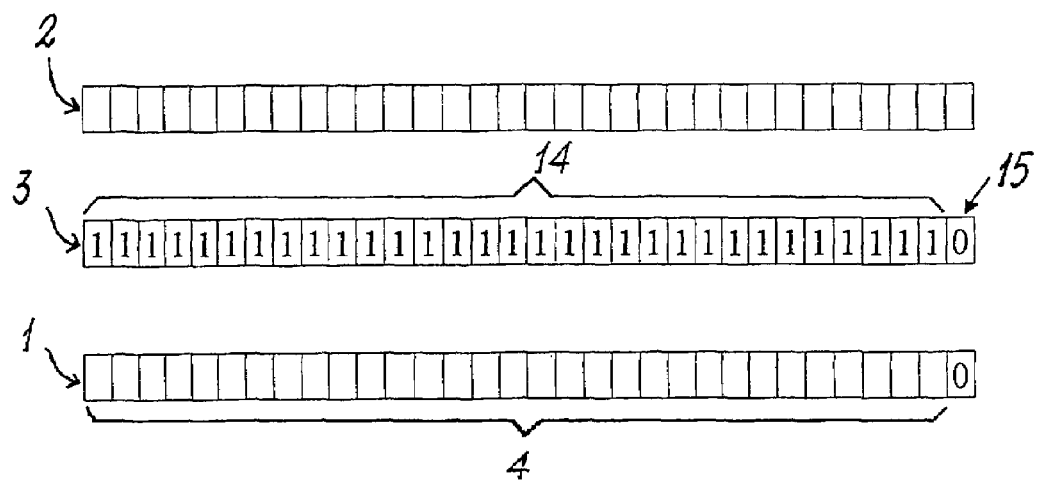
FIG. 1 shows a first, second and third masked address obtained by making an operation between a first, a second and a third packets destination address, and a first, a second and third mask.
Figure 2:
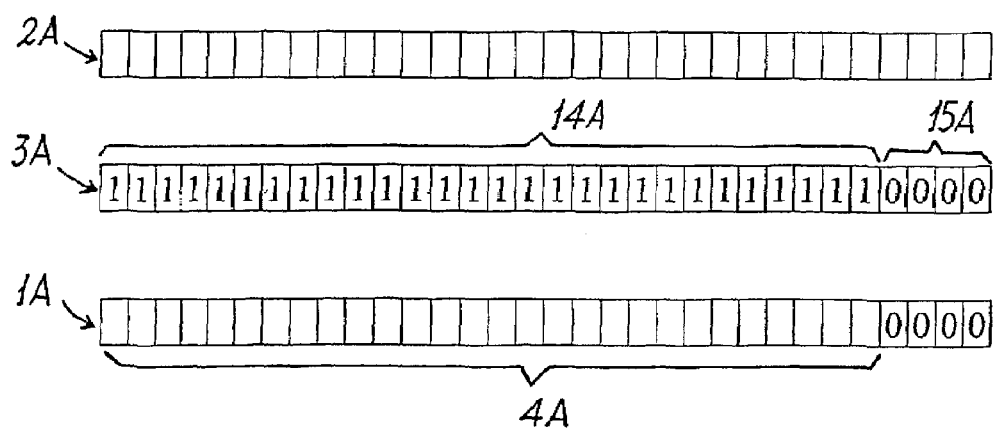
FIG. 2 shows a first, second and third masked address obtained by making an operation between a first, a second and a third packets destination address, and a first, a second and third mask.
Figure 3:
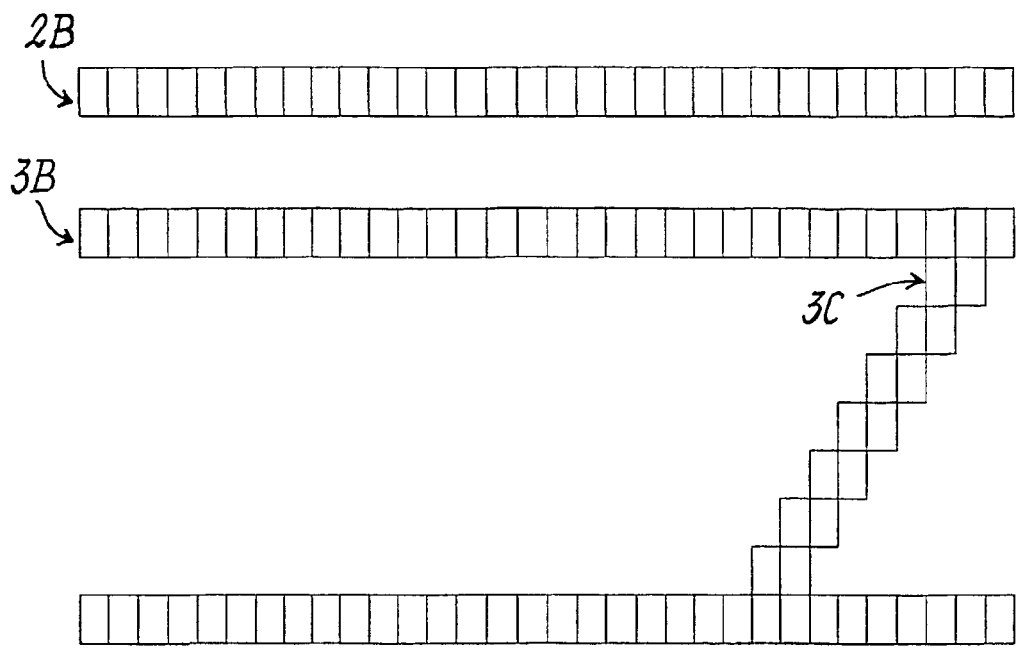
FIG. 3 shows a first, second and third masked address obtained by making an operation between a first, a second and a third packets destination address, and a first, a second and third mask.

In FIG. 1, a masked address 1 obtained by making an AND between a packets destination address 2, i.e. an IP address, and a mask 3 is represented. In this case, the part 4 of the masked address will be considered as the network prefix of the IP address and will be searched in a prefix database or table. The mask 3 comprises a first portion 14 comprising only a not masking value 1 and a second portion 15 comprising only a masking value 0. The first part 14 of the mask comprises thirty-one bit and the second part 15 only one bit. In FIG. 2 a second masked address 1A obtained by making an AND between an IP address 2A and a mask 3A is represented, in this case the portion 4A of the masked address will be considered as the network prefix of the IP address and will be searched in the prefix database or table. The mask 3A comprises a first portion 14A comprising only a not masking value 1 and a second portion 15A comprising only a masking value 0. The first portion 14A of the mask comprises twenty-eight bits and the second part 15A four bits. In FIG. 3, it is shown how the above masked addresses are obtained according to the invention. In a first step the IP address 2B is masked with a mask having all 1 (this mask has only a first portion comprising all not masking bits and has not a second portion comprising masking bits). Therefore the network prefix to be searched corresponds to the same IP address. If this masked network prefix does not match an entry in the routing table, then a second mask 3B is generated having all 1 except for the less significant bit (bit n−1) which is 0. If the network prefix obtained with this second mask is not found, a third mask 3C is generated, having two 0 as the less significant bits. In FIG. 3 the method is shown only with ten masks because the 23 bits network prefix obtained with the tenth mask is assumed to match an entry in the corresponding table.

Preferably, according to the invention, a new mask and a new network prefix is generated every clock cycle. This is particularly advantageous if the method is a compression method and it is employed in combination with a predictable duration algorithm suitable of a pipelined implementation like the CSSA algorithm.

Figure 4:
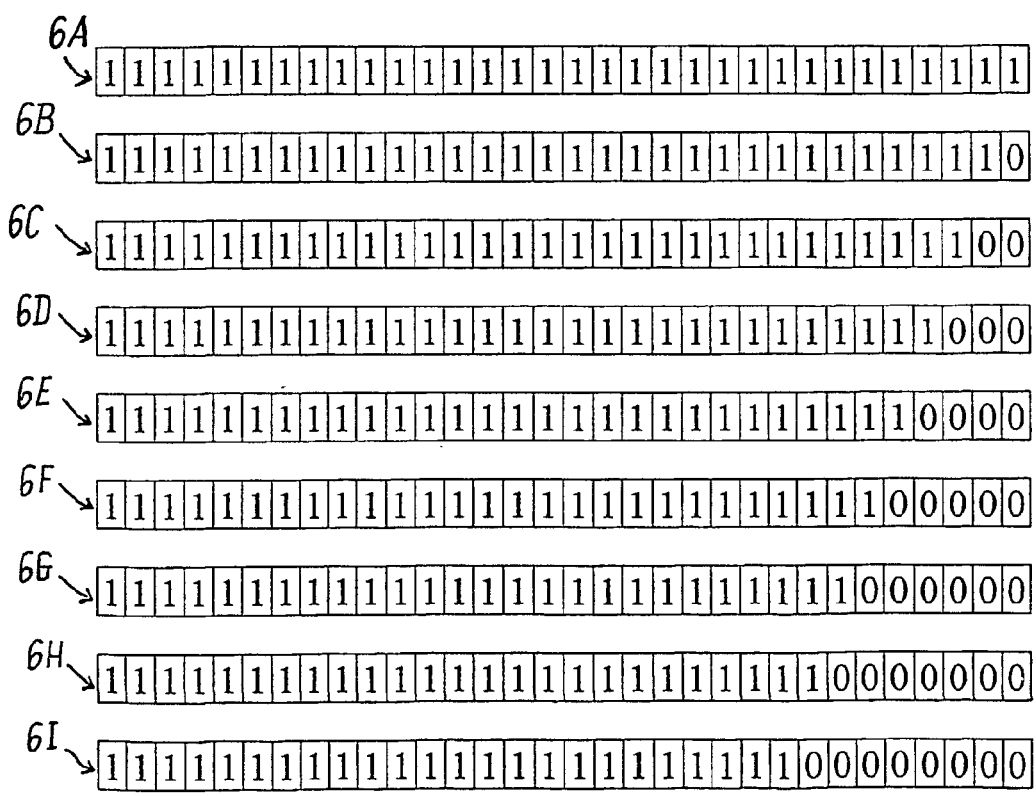
FIG. 4 shows a plurality of masked address used in a method according to the invention.

In FIG. 4, the address mask 6A used in the first clock cycle and the masks 6B-I used in the subsequent eight cycles are shown.

Using a predictable duration algorithm suitable of a pipelined implementation and in particular the CSSA one, it is possible to perform the method according to the invention in the following way:

1) at every clock cycle the IP address is AND with the mask corresponding to that clock cycle and the masked address obtained by such AND is sent to the pipelined compression algorithm, 2) as soon as a search gives a positive result (the masked address was found in the data base) the method according to the invention stop to generate new mask and masked address and start with a new address (if any), 3) if there are no result the search fails after that all the bits (up to the fixed value referred above) of the IP address have been masked.

The time in term of clock cycles, which is needed to bring the CSSA search to an end depends on the address is found or not present. There may be two possibilities:

a) The address is not found at all. In this case the time needed is 31, 30, 29, 28. 27 clock cycles for, respectively, a class A, B, C, D, E supernet or subnet IP address, plus latency to have an answer, but the CSSA search engine is occupied for only 31-27 clock cycles.

b) The address is found with m bits of the IP address masked. In this case the search needs m plus latency clock cycles, and the CSSA search engine is occupied for m plus latency clock cycles if m<32−latency, if m=>32−latency the search engine is occupied for 32 clock cycles.

The rules stated above are valid in the hypothesis that the implementation of the CSSA algorithm is able to perform a single search with arbitrary latency and zero clock delay. This means that after having fed the CSSA with first address to compress the corresponding compressed address is outputted after the latency time (a certain number of clock cycles). All successive compressed addresses will be outputted from the CSSA one for each clock cycle with no idle cycles between (zero delay) them after the first one. This in the hypothesis that all successive addresses to compress are provided to the CSSA one for each clock cycle with no idle cycles between them. The real situation may be different and the performances of the whole system depend on several factors like minimum inter-arrival time of packets, minimum packet length, parallelism used to transmit packets and clock frequency of the hardware implementing the described algorithm.

A possible high-level source code listing the software for implementing the above-described method with a CSSA algorithm will now be described. The IP address is expressed in binary notation and has bit 31 as the less significant bit and bit 0 as the most significant one. With reference to the above described software, the data structure is as following:

Nbit is the width of the incoming IP address,

Cbit is the bit width of the compressed address,

Nbit-net-min is the smallest index of network portion of the IP address.

The main variables used by the CSSA base method according to the invention are:

IP-ADDR-IN (0:Nbit−1) is the incoming IP address

IP-ADDR-MASK (0:Nbit−1) is the address mask (0 masking 1 not masking)

IP-ADDR-MASKED (0:Nbit−1) is the masked IP address

IP-ADDR-COMPRESSED(0:Cbit−1) is the compressed address.

The configuration algorithm consists of two procedures accessing the basic CSSA compressor:

The first one named SET_ADDRESS( ) is used to set the compressed address represented by its argument into the CSSA address compressor:

/* CSSA addresses setup */

SET_ADDRESS(IP_ADDR_COMPRESSED[0:Cbit−1]);

The second one, named UNSET_ADDRESS( ), is used to unset the compressed address represented by its argument into the CSSA address compressor:

/* CSSA addresses unset */

UNSET_ADDRESS(IP_ADDR_COMPRESSED[0:Cbit−1]);

The operation algorithm implementing the method according to the invention, wherein the routing algorithm is the known CSSA one, comprises the following instructions:

/* BEST PREFIX MATCH address compression */

```
FOR EACH IP_ADDR_IN[0:Nbit-1]
    VALID=FALSE;
    IP_ADDR_MASK[0:               Nbit-1]
      =11111111111111111111111111111111;
    j=Nbit-1;
    WHILE (VALID==FALSE) AND (j>=Nbit_net_min) DO
        IP_ADDR_MASKED[0:Nbit-1]=IP_ADDR_IN[0:
          Nbit-1] AND IP_ADDR_MASK[0:Nbit-1];
        RUN CSSA(IP_ADDR_MASKED[0:Nbit-1], IP_AD-
          DR_COMPRESSED[0:Cbit-1], VALID);
        IP_ADDR_MASK[j]=0;
        j=j-1;
    END WHILE;
    IF (VALID==TRUE) THEN
        FOUND=TRUE;
        OUT     (IP_ADDR_COMPRESSED[Cbit-1:0],
          FOUND);
    ELSE
        FOUND=FALSE;
    END IF;
END FOR;
```

According to the invention the above operation algorithm may be used with other known compressing or routing algorithms.

According to the invention the method can be optimised:

a) after having run the CSSA over the masked address the next bit of the mask is set to a masking value, b) the masked address is scanned starting from the bit corresponding to the last bit set to a masking value in the address mask to search for a string of adjacent masking values and as soon as a bit set to a non masking value is found the search is stopped, c) all the bits of the address mask having corresponding positions to the bit of the masked address found at masking value at previous step are set to masking values, d) the masked address is updated (by making the AND between the IP address and the address mask if the masking value is 0 or the OR between the IP address and the mask if the masking value is 1).

In the optimised algorithm every time starting from the bit of the destination address to be processed (included) it is present a pattern of adjacent masking values (of any length, one included) this entire pattern inside the destination address is masked in a single step instead of step by step. The mask is not updated digit by digit but the string of digit of the mask that occupy the same position of the pattern of adjacent masking values in the destination address is masked in a single step. All the searches corresponding to the intermediate masking are skipped.

The above concept will be explained by way of an example, using a hypothetical IP address of 6 bit, instead of the real 32-bit address.

If we have to mask the IP address 110011 and the best prefix matching entry in the database is 100000, according to the invention:

1—the first mask is 111111 and the masked address is 110011

2—the second mask is 111110 and the masked address is 110010

3—the third mask is 111100 and the masked address is 110000

4—the fourth mask is 111000 and the masked address is 110000

5—the fifth mask is 110000 and the masked address is 110000

6—the sixth mask is 100000 and the masked address is 100000

The method according to the optimised version of the invention skips the third and fourth masking, thereby the best prefix matching entry will be found in four steps instead of six.

An algorithm for implementing the improved method described above is:

/* OPTIMISED BEST PREFIX MATCH address compression */

```
FOR EACH IP_ADDR_IN[0:Nbit-1]
    IP_ADDR_MASK[0:Nbit-1]
       =11111111111111111111111111111111;
    VALID=FALSE;
    j=Nbit-1;
    WHILE(VALID==FALSE) AND (j>=Nbit_net_min) DO
       IP_ADDR_MASKED[0:Nbit-1]=IP_ADDR_IN[0:
          Nbit-1] AND IP_ADDR_MASK[0:Nbit-1];
       RUN CSSA(IP_ADDR_MASKED[0:Nbit-1], IP_AD-
          DR_COMPRESSED[0:Cbit-1], VALID);
       DO
          IP_ADDR_MASK[j]=0;
          j=j-1;
       UNTIL  (IP_ADDR_MASKED(j)==0)  AND
          (j>=Nbit_net_min);
    END WHILE;
    IF (VALID==TRUE) THEN
       FOUND=TRUE;
       OUT     (IP_ADDR_COMPRESSED[Cbit-1:0],
          FOUND);
    ELSE
       FOUND=FALSE;
    END IF;
END FOR;
```

Figure 5:
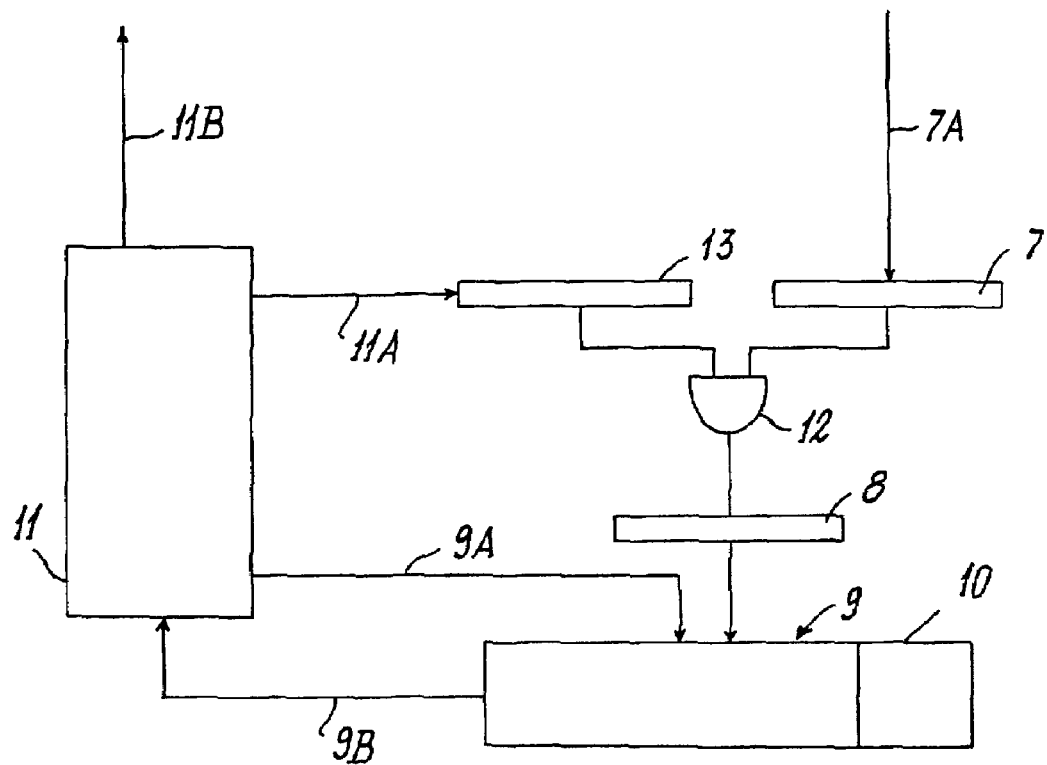
FIG. 5 shows a block diagram of a router or compression device in hardware illustrating its operation.

The method according to the invention may be implemented by a device represented in FIG. 5 comprising: first memory storing means 7 of the current packets destination address to be routed or compressed; second memory storing means 13 of the current address mask, means 12 for making an AND operation between the current packets destination address and the current address mask; third memory means for storing the current masked address 8, a first compression or routing data processor 9 implementing a known compression or routing algorithm comprising at least one database 10 of prefix entries each of which containing entries corresponding to a desired output data link, and a second data processor 11.

The first memory storing means are connected to a first incoming line 7A inputting the incoming packet destination address to be compressed or routed. The second memory storing means 13 is connected to the second data processor by a line 11A which inputs to the memory means 13 a shift command every time a new address mask is needed and which resets all the bit to 1 (if 1 is the masking value, 0 otherwise) every time a new process is started. The first data processor is of a known type, i.e. a processor implementing CSSA algorithm and is connected to an input line 9A, which inputs a compression or routing request, and an output line 9B, which outputs a compression or routing request result, and, if found, the best matching compressed or routing address. The second data processor 11 comprises known means for generating the requested current address mask according to the invention until in the data base 10 it is found an entry matching the masked address obtained by making an and between said packets destination address contained in memory 7 and said address mask contained in memory 13, i.e. the compression request result inputted by line 9B is not true, or all the n bits of the current packets destination address have been masked.

The second data processor 11 comprises also an output line 11B for outputting the compressed address found by data processor 9, a validator value and an answer to a best prefix match request which may be inputted to data processor 11 with a dedicated line not represented in the drawing.

It is to be noted that the above-described device for implementing the method may be changed in many ways according to the expert in the art. For example, the two distinct data processors 9 and 11 may be implemented in a single unit, and or the third memory means 8 may be omitted.

It should finally be noted that the before described embodiment is provided by way of example only, and that numerous modifications are possible, all falling within the scope of protection of the invention. For instance, the first masking operation with i=0, i.e. with a mask having n bit equal to 1 may be skipped and the best prefix matching may be performed directly on the inputted packets destination address, i.e. by sending directly to the first data processor 9 the current packets destination address.

The method according to invention may be implemented using as masking value 1. In this case the masking operation is an OR operation and the packet destination address and the address mask are negated before being inputted to the OR operation and the output of said OR operation is negated also, said negated output being the address mask.

The invention claimed is:

1. A method of routing packets with a destination address (2, 2A, 2B) through an electronic routing device, said packets destination address comprises bit packets and wherein said address is a classless address indicative of a desired destination, said routing device having at least a database (10) of prefix entries, said entries corresponding to a desired output data link, wherein said method for each packet destination address (2, 2A, 2B) comprises the steps of:
   generating an address mask (3, 3A, 3B-C, 6A-I) having a number of bits equal to that of the packets destination address (2, DA, 2B) and comprising two portions: a first portion (14, 14A) starting from bit 0 (MSB) and ending with a bit (n−1)−i, and a second portion (15, 15A) starting from bit n−i and ending with bit n−1, wherein the first portion (14,14A) comprises only a non masking value and the second portion (15, 15A) comprises only a masking value,
   i being an integer comprised between 0 and n−1,
   wherein i=0 in the first iteration, and i being incremented by one for each subsequent iteration until a match is found or it has reached a fixed value (n−1);
   continuing to generate an address mask (3, 3A, 3B-C, 6A-1) until an entry, matching a masked address (1, 1A) obtained by performing a masking operation on said packet destination address (2, 2A, 2B) and said address mask (3, 3A, 3B-C, 6A-1), is found in said data base (10);
   wherein said masking operation is an AND operation if a masking value is 0 and a non masking value 1, said masking operation is an OR operation if the masking value is 1 and the not masking value 0, and the packets destination address and the address mask are negated before being inputted to the OR operation and the output of said OR operation is negated;
   stopping, if a match is found, said generation of address masks (3, 3A, 3B-C, 6A-I) and outputting the output data link corresponding to said match; and
   outputting, if no match is found or i is equal to said fixed value (Nbit), a message indicating that no output data link was found.

2. A method of compressing packets with a destination address (2, 2A, 2B) through an electronic compressing device, said packets destination address comprising bit packets and wherein said address is a classless address indicative of a desired destination, said compressing device having at least a database (10) of prefix entries, each of which containing entries corresponding to a desired output data link, wherein said method for each packet destination address (2, 2A, 2B) comprises the steps of:

generating an address mask (3, 3A, 3B-C, 6A-I), having a number of bits equal to that of the packets destination address (2, 2A, 2B) and comprising two portions: a first portion (14, 14A) starting from bit 0 and ending with a bit (n−1)−i, and a second portion (15, 15A) starting from bit n−i and ending with bit n−1, wherein the first portion (14, 14A) comprises only a not masking value and the second portion (15, 15A) comprises only a masking value, wherein i is an integer between 0 and n−1;

wherein i=0 in the first iteration, and i being incremented by one for each subsequent iteration until a match is found or it has reached a fixed value (n−1);

continuing to generate an address mask (3, 3A, 3B-C, 6A-I) until an entry, matching a masked address (1, 1A), obtained by performing a masking operation on said packet destination address (2, 2A, 2B) and said address mask (3, 3A, 3B-C, 6A-I), is found in said data base (10);

wherein said masking operation is an AND operation if a masking value is 0 and a not masking value 1; and the not masking value 0, and the packets destination address and the address mask are negated before being inputted to the OR operation and the output of said OR operation is negated;

stopping, if a match is found, said generation of address masks (3, 3A, 3B-C, 6A-I) and outputting the output data link corresponding to said match; and outputting, if no match is found or i is equal to said fixed value (Nbit), a message indicating that no output data link was found.

3. Method according to claim 1 wherein the fixed value (Nbit) is the smallest bit index of the IP network portion of the packets destination address (2, 2A, 2B).

4. Method according to claim 1 wherein the matching between the data base entry and the masked address (1, 1A) is an exact prefix matching.

5. Method according to claim 1 wherein the matching between the data base entry and the masked address (1, 1A) is a best prefix matching.

6. Method according to claim 1 wherein a predictable duration routing or compression method is used.

7. Method according to claim 6 wherein a pipelined compression algorithm is used.

8. Method according to claim 6 wherein a CSSA clustered sequential search algorithm is used.

9. Method according to claim 1 wherein at every clock cycle an address mask (3, 3A, 3B-C, 6A-I) is generated.

10. Method according to claim 1 wherein at every clock cycle a masked address (1, 1A) obtained by making a masking operation between the current packets destination address (2, 2A, 2B) and the address mask (3, 3A, 3B-C, 6A-I), corresponding to the current clock cycle is generated.

11. Method according to claim 10 wherein at every clock cycle the masked address (1, 1A) is inputted to a routing or compression algorithm.

12. Method according to claim 1, wherein:

a) the masked address (1, 1A) is scanned starting from the bit corresponding to the last bit set to a masking value in the address mask (3, 3A, 3B-C, 6A-I) to search for a string of adjacent masking values and as soon as a bit corresponding to said first portion comprising the non masking value is found the search is stopped;

b) all the bits of the address mask (3, 3A, 3B-C, 6A-1) having corresponding positions to the bit of the masked address (1, 1A) found at masking value at previous step are set to masking values, c) the masked address (1, 1A) is updated, by performing an AND operation on the packet destination address (2, 2A, 2B) and the address mask (3, 3A, 3B-C, 6A-I) if the masking value is 0 or an OR operation on the packet destination address (2, 2A, 2B) and the address mask (3, 3A, 3B-C, 6A-I) if the masking value is 1.

13. Method according to claim 12 wherein previous to the scanning of the masked address (1, 1A) the clustered sequential search algorithm is performed on the masked address (1, 1A) and then the next bit of the address mask (3, 3A, 3B-C, 6A-I) is set to a masking value.

14. Method according to claim 1, wherein every time the packet destination address (2, 2A, 2B) to be masked includes the entire pattern of adjacent masking values of any length, the masking process is done in a single step instead of step by step.

15. Routing device for routing packets with a destination address (2, 2A, 2B), said packets destination address comprising bit packets and a classless address indicative of a desired destination, said routing device comprising at least a database (10) of prefix entries, each of which containing entries corresponding to a desired output data link, comprising:

means (11, 13) for generating an address mask (3, 3A, 3B-C, 6A-I) having a number of bits equal to that of the packets destination address (2, 2A, 2B) and comprising two portions: a first portion (14, 14A) starting from bit 0 and ending with a bit (n−1)−i, and a second portion (15, 15A) starting from bit n−i and ending with bit n−1; wherein the first portion (14, 14A) comprises only a not masking value and the second portion (15, 15A) comprises only a masking value, i being an integer comprised between 0 and n−1;

means (12) for generating a masked address (1, 1A) obtained by performing a masking operation on said packet destination address (2, 2A, 2B) and said address mask (3, 3A, 3B-C, 6A-I) said masking operation is an AND operation if a masking value is 0 and a not masking value 1; said masking operation is an OR operation if the masking value is 1 and the not masking value 0, and the packet destination address and the mask are negated before being inputted to the OR operation and the output of said OR operation is negated;

means (9) for searching in said database (10) for an entry matching the current masked address;

control means (11) for creating a first address mask comprising only said first part wherein i=0 in the first iteration, and for generating said masked address and for making said search until an entry matching said masked address is found in said data base or no match is found, said control means incrementing i until a match is found or it has reached a fixed value (Nbit), and if found outputting the found output data link corresponding to the matching entry.

16. Compression device for compressing packets with a destination address (2, 2A, 2B), said packets destination address comprising n bit packets and a classless address indicative of a desired destination, and compressing device having at least a database (10) of prefix entries, each of which containing entries corresponding to a desired output data link, comprising:

means (11, 13) for generating an address mask (3, 3A, 3B-C, 6A-I) having a number of bits equal to that of the packets destination address (2, 2A, 2B) and comprising two portions: a first portion (14, 14A) starting from bit 0 and ending with a bit (n−i)−i, and a second portion (15, 15A) starting from bit n−i and ending with bit n−1; wherein the first portion (14, 14A) comprises only a not masking value and the second portion (15, 15A) comprises only a masking value, i being an integer comprised between 0 and n−1;

means (12) for generating a masked address (1, 1A) obtained by performing a masking operation on said packet destination address (2, 2A, 2B) and said address mask (3, 3A, 3B-C, 6A-I), said masking operation is an AND operation if a masking value is 0 and a not masking value 1; said masking operation is an OR operation if: the masking value is 1 and the not masking value 0, and the packet destination address and the address mask are negated before being inputted to the OR operation and the output of said OR operation is negated;

means (9) for searching in said database (10) for an entry matching the current masked address; and control means (11) for creating a first address mask comprising only said first part wherein i=0 in the first iteration, and for generating said masked address and for making said search until an entry matching said masked address is found in said data base or no match is found, said control means incrementing i until a match is found or i has reached a fixed value (Nbit), and if found, outputting the output data link corresponding to the matching entry.

17. Device according to claim 15 wherein the searching means (9) are exact prefix searching means.

18. Device according to claim 15 wherein the searching means (9) are best prefix searching means.

19. Device according to claim 15, wherein the searching means (9) are pipelined searching means.

20. Device according to claim 15 wherein the means (12) for generating a masked address (1, 1A) generate a new masked address at every clock cycle.

21. Device according to claim 15 wherein the means (11, 13) for generating an address mask (3, 3A, 3B-C, 6A-I) generate a new address mask every clock cycle.

22. Device according to claim 15 wherein at every clock cycle the masked address (1, 1A) is inputted to the searching means (9).

23. Device according to claim 15 comprising:

means for scanning the masked address (1, 1A) starting from the bit corresponding to the last bit set to a masking value in the address mask (3, 3A, 3B-C, 6A-I);

means for searching for a string of adjacent masking values, said searching means interrupting the search as soon as a bit set to a non masking value is found, means for setting to a masking value all the bits of the address mask (3, 3A, 3B-C, 6A-I) having corresponding positions to the bit of the masked address (1, 1A) found at masking value by said searching means; and means for updating the masked address (1, 1A) by making an AND operation between the packet destination address (2, 2A, 2B) and the address mask (3, 3A, 3B-C, 6A-I) if the masking value is 0 or an OR operating between the packet destination address (2, 2A, 2B) and the address mask (3, 3A, 3B-C, 6A-I) if the masking value is 1.

24. Device according to claim 23 wherein previous to the scanning means there are provided means for performing the clustered sequential search algorithm over the masked address (1, 1A) and means for setting the next bit of the address mask (3, 3A, 3B-C, 6A-I) to a masking value.

* * * * *